(12) United States Patent
Maloney

(10) Patent No.: US 6,323,985 B1
(45) Date of Patent: *Nov. 27, 2001

(54) MOSFET THROUGH SILICON MODULATOR AND METHOD

(75) Inventor: Timothy J. Maloney, Palo Alto, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,446

(22) Filed: Dec. 30, 1998

(51) Int. Cl.$^7$ .................................................. G02F 1/03
(52) U.S. Cl. .................. 359/248; 359/237; 359/245; 385/2; 385/14; 385/44; 257/84; 257/446; 257/458
(58) Field of Search .................. 359/245, 247, 359/248, 237, 276, 279, 569, 558; 385/2, 14, 44; 257/84, 85, 184, 446, 458

(56) References Cited

U.S. PATENT DOCUMENTS

| | | | |
|---|---|---|---|
| 3,714,522 | 1/1973 | Komiya et al. | 317/235 R |
| 3,955,190 | 5/1976 | Teraishi | 340/336 |
| 4,855,591 | 8/1989 | Nakamura | 250/225 |
| 4,966,445 | 10/1990 | Takeda | 350/377 |
| 5,040,859 | 8/1991 | White | 359/276 |
| 5,155,617 | 10/1992 | Solgaard | 359/245 |
| 5,157,537 | 10/1992 | Rosenblatt | 359/245 |
| 5,249,074 | 9/1993 | Topham | 359/248 |
| 5,274,246 | * 12/1983 | Hopkins et al. | 359/248 |
| 5,280,189 | * 1/1994 | Schuppert et al. | 257/458 |
| 5,360,987 | * 11/1994 | Shibib | 257/446 |
| 5,418,871 | * 5/1995 | Revelli, Jr. et al. | 359/245 |
| 5,428,226 | 6/1995 | Adams | 257/80 |
| 5,467,215 | 11/1995 | Lebby | 359/247 |
| 5,488,504 | * 1/1995 | Worchesky et al. | 359/248 |
| 5,491,580 | 2/1996 | O'Meara | 359/247 |
| 5,608,568 | * 3/1997 | Blodgett et al. | 359/248 |
| 5,717,225 | * 2/1998 | Lomashevich | 257/84 |
| 6,075,908 | 6/2000 | Paniccia et al. | 385/14 |
| 6,166,846 | * 12/2000 | Maloney | 359/247 |

OTHER PUBLICATIONS

Soref, R.A., et al., "Electrooptical Effects in Silicon", *IEEE Journal of Quantum Electronics*, vol. QE–23, No. 1, pp. 123–129, (Jan. 1987).

* cited by examiner

Primary Examiner—Loha Ben
(74) Attorney, Agent, or Firm—Schwegman, Lundberg, Woessner & Kluth, P.A.

(57) ABSTRACT

Through silicon optical modulators (TSOM) formed in a silicon integrated circuit comprise a grating array of MOSFET elements. The TSOM's provide optical phase shifts from different areas which contrast with one another coherently. Phase modulated optical beams reflected from the grating interfere with one another and allow the modulation to be easily detected off-chip. In one embodiment, a two dimensional array has a gate structure which is used to modulate a light beam by forming accumulation layers. In another embodiment, a one dimensional array is formed using parallel gate strips, where alternate gates are used as reference reflectors.

27 Claims, 6 Drawing Sheets

MOSFET THROUGH SILICON MODULATOR AND METHOD

TECHNICAL FIELD

The present invention relates generally to optical modulators and in particular the present invention relates to through silicon optical modulators.

BACKGROUND

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off-chip circuit connections. At slower clock speeds, the capacitive loading on integrated circuit lines is generally not a significant factor. However, as integrated circuit design clock speeds continue to climb towards the gigahertz range and beyond, it is evident that one of the major bottlenecks for future integrated circuits, such as for example, but not limited to, microprocessors, off-chip caches, controllers, etc. will be the input/output bandwidth and/or round trip delay between and within chips.

Prior attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power and induce noise. Further, adding large amounts of on-die decoupling capacitance to suppress noise results in more heat which needs to be dissipated and a requirement for more valuable integrated circuit die area.

Other prior attempts to overcome traditional integrated circuit interconnection limitations included the use of optical interconnections. The prior attempts at optical interconnections between integrated circuits have generally involved or have been based on two typical approaches.

One approach is based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine GaAs with silicon based metal oxide semiconductor (MOS) technology.

The second typical prior art approach is based on using silicon based optical waveguides. These waveguides are generally built using silicon-on-insulator (SOI) based processing techniques. Prior SOI based modulators utilize silicon waveguide structures to switch light passing through the optical waveguide. The switching mechanism utilizes injection of carriers into the waveguide, similar to a bipolar based transistor. One consequence of this is slow speed, for example up to several hundred megahertz, and very high power consumption, for example, 10 mW or more for a single switch. In order to increase the modulation depth, one often tries to obtain a large interaction volume between the injected charge and the light beam. This is generally accomplished by making very long waveguides, for example, on order of thousands of microns, thereby increasing the interaction length through which the light beam travels. As can be appreciated to those skilled in the art, actual incorporation of SOI waveguides into existing multi-layer standard CMOS based processing is not straightforward. Thus, utilization of these waveguide structures becomes quite impractical when used for high speed input/output in large transistor count microprocessors.

For the reasons stated above, and for other reasons stated below which will become apparent to those skilled in the art upon reading and understanding the present specification, there is a need in the art for an apparatus and method for optically modulating light using MOS fabrication technologies.

SUMMARY OF THE INVENTION

In one embodiment, the present invention relates to an integrated circuit optical modulator comprising an isolation well fabricated in a substrate of the integrated circuit, a plurality of source/drain regions fabricated in the isolation well, and a two-dimensional gate electrode array fabricated on top of the isolation well. The plurality of source/drain regions are located in openings in the two-dimensional gate electrode. The plurality of source/drain regions provide a reflected light reference. A phase of light reflected from the two-dimensional gate electrode is controlled in response to a voltage signal applied to either the isolation well or the two-dimensional gate electrode such that light passing through the substrate is reflected by the gate electrode and passes through at least two electrical accumulation layers when the voltage signal is in a first state.

In another embodiment, an integrated circuit optical modulator comprises an isolation well fabricated in a substrate of the integrated circuit, a first plurality of gate electrode strips fabricated on top of the isolation well and extending in a first direction, and a second plurality of gate electrode strips fabricated on top of the isolation well and extending in the first direction such that the first and second plurality of gate electrode strips are fabricated substantially parallel. A plurality of source/drain regions are fabricated in the isolation well and located between the first and second plurality of gate electrodes strips. The first plurality of gate electrode strips are electrically coupled to the isolation well and provide a reflected light reference, and the second plurality of gate electrode strips provide reflected light having a phase dependent upon a state of the output signal.

DETAILED DESCRIPTION OF THE INVENTION

Figure 1:
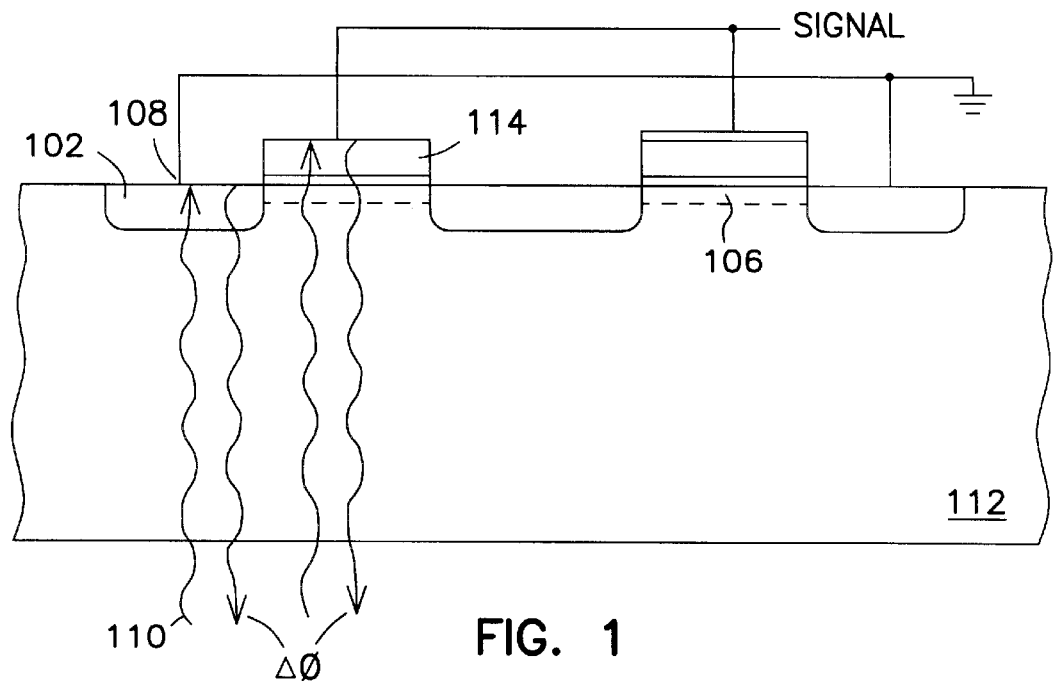
FIG. 1 is a cross-section of an optical modulator using an NMOS FET.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The terms wafer and substrate used in the following description include any structure having an exposed surface with which to form the integrated circuit (IC) structure of the invention. Both wafer and substrate include, but are not limited to, doped and undoped semiconductors, epitaxial semiconductor layers supported by a base semiconductor or insulator, as well as other semiconductor structures well known to one skilled in the art. The term conductor is understood to include conductors and semiconductors, and the term insulator is defined to include any material that is less electrically conductive than the materials referred to as conductors. The following detailed description is, therefore, not to be taken in a limiting sense, and the scope of the present invention is defined only by the appended claims, along with the full scope of equivalents to which such claims are entitled.

Prior to describing the present invention, a description of a related optical modulation using a metal oxide semiconductor (MOS) integrated circuit devices is provided. An additional description of one MOS modulator is provided in U.S. patent application Ser. No. 08/993,786, entitled "METHOD AND APPARATUS FOR OPTICALLY MODULATING LIGHT THROUGH THE BACK SIDE OF AN INTEGRATED CIRCUIT DIE", and filed Dec. 19, 1997.

The related MOS modulator provides a silicon phase diffraction grating including a two-dimensional array of MOS integrated circuit devices. The modulator is designed to have a light beam directed through the back of an integrated circuit. The light is deflected by the integrated circuit. If regions of the circuit through which the light passes are charged, the phase of the deflected light is changed due to a plasma optical effect. In contrast, a phase of the portion of deflected light beam which passes through uncharged regions is not changed. If the charged areas are modulated, a modulated phase change can be provided.

The plasma optical effect arises due to an interaction between the optical electric field (E-field) vector and free charge carriers present along the propagation path of the light beam. The electric field of the light beam polarizes the free charge carriers and effectively perturbs the local dielectric constant of the medium. This in turn leads to a perturbation of the local velocity of an optical wave and hence the refractive index for the light, since the refractive index is simply the ratio of the speed of the light in a vacuum to that in the medium. The free charge carriers also lead to absorption of the optical field as optical energy is used to accelerate the free charge carriers. Generally, the refractive index perturbation is a complex number with the real part being the part which causes the velocity change and the imaginary part being related to the free charge carrier absorption. The amount of phase shift due to free charge carriers due to the plasma optical effect is given by:

$$\Phi = n_o \omega_p^2 \lambda L / (4\pi c^2) \quad (1)$$

where $\Phi$ is the phase shift, $n_o$ is the nominal index of refraction, $\omega_p$ is the plasma optical frequency, $\lambda$ is the wavelength of light, L is the thickness of the free charge carrier region and c is the speed of light.

As a result of the phase shifting due to the plasma optical effect, interference occurs between the phase modulated and non-phase modulated portions of the diffracted light beam causing constructive and destructive interference in the wavefronts that propagate away from an integrated circuit. Accordingly, a zero order diffraction of the diffracted light beam that passes through and propagates away from an integrated circuit is amplitude modulated in response to an integrated circuit signal which modulates the amount of free charge in charged regions. Thus, the integrated circuit signal may be extracted from the integrated circuit through the amplitude modulated zero order diffraction of a diffracted light beam.

FIG. 1 illustrates a light beam passing though source and drain regions 102, as well as a channel region 106 of a MOS transistor. The light beam 110 is deflected off of a deflector 108, which in one embodiment may be either a source/drain or gate contact conductor, and back out of the semiconductor silicon substrate 112. As shown, deflected light passes through both the source/drain regions 102, and a modulating inversion layer of the transistor channel. Formation of the inversion layer is controlled by a potential applied to the transistor gate 114. Again, the light is reflected after passing through the gate.

As discussed above, deflected light is phase shifted due to the free charge carriers in the channel due to the plasma optical effect. Since the amount of free charge in channel 106 is modulated in response to a signal applied to the gate, the phase of deflected light through the inversion layer is also modulated in response to the signal. In contrast, there is no relative phase shift in deflected light through the source/drain regions since there is substantially no free charge in source/drain regions.

The modulation structures can be arranged to form an array of parallel strips of gate polysilicon which cause constructive and destructive interference in the wavefronts that propagate away from the reflective surfaces. This arrangement is referred to herein as a diffraction grating. Since the amount of phase shift in the deflected light beams that pass through channels is modulated in response to a signal, the optical power in the zero order diffraction beam is modulated accordingly. When the grating is turned off (no inversion layer), the total optical power in the deflected beam that comes back out of the silicon is unaltered. When the inversion layer is present, optical power is redistributed due to interference from the zero order to higher orders. One solution to detecting the power modulation is to look at either the zero order diffraction, or look at all, or some, of the higher orders but not the zero order. If one looks at the zero order diffraction, a photo detector receiving the reflected light sees a nominal direct current (DC) power with the grating off and a lightly reduced power when the modulator is turned on. When looking at the null points in the higher orders of diffraction, the photo detector sees zero power with the grating off and a finite power with the grating on. Using known techniques in optical signal recovery, the signal can be extracted from the modulated zero order diffraction, or the higher order diffractions, of the deflected light beams.

It is observed above in equation (1) that the amount of phase shift is dependent upon the thickness L of the charged region due to plasma optical effect. Typical inversion layers found in many of today's advanced MOS technology are quite thin, for example, on the order of approximately 5 nm. One can observe that the path length L through which the optical beam passes is thus very small. This may result, depending on the free charge carrier density, in a very small phase shift. Correspondingly, this will result in a very small amplitude modulation.

The following description provides an apparatus and method for increasing the efficiency of a Through Silicon Optical Modulator (TSOM). In one embodiment the device increases a free-carrier-induced phase shift of a light beam by arranging for an accumulation layer on both sides of a MOS gate. In one embodiment, the modulator is fabricated with an n-well, p-epi (epitaxial) MOS process with polysilicon gate doped by source-drain implant. Other conductive can be used to form the gate structures, and is not limited to polysilicon.

Figure 2:
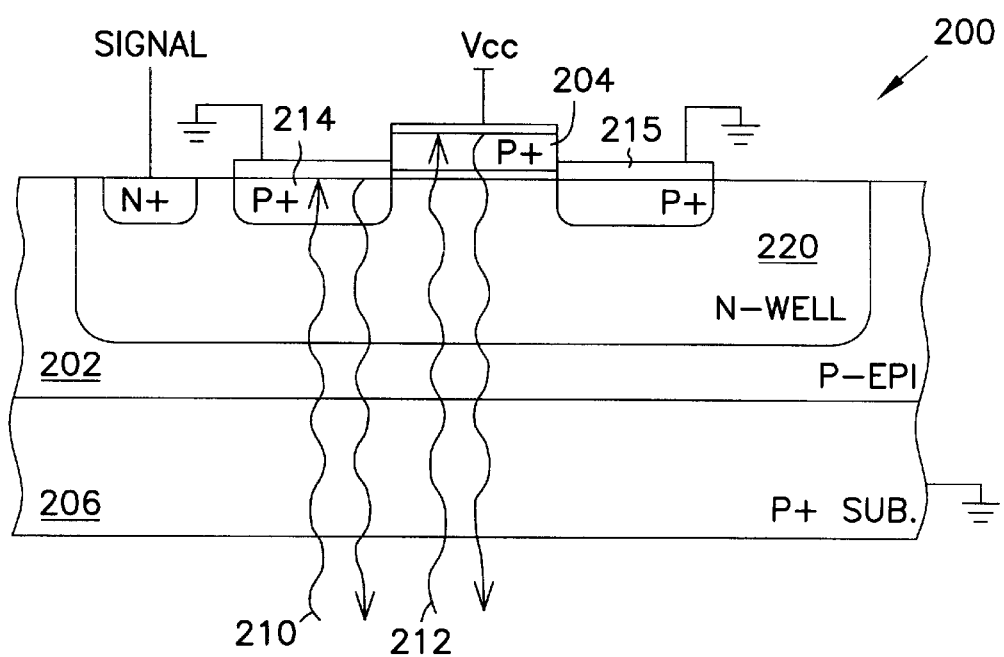
FIG. 2 is a cross-section of an optical modulator using a PMOS FET.
Figure 3:
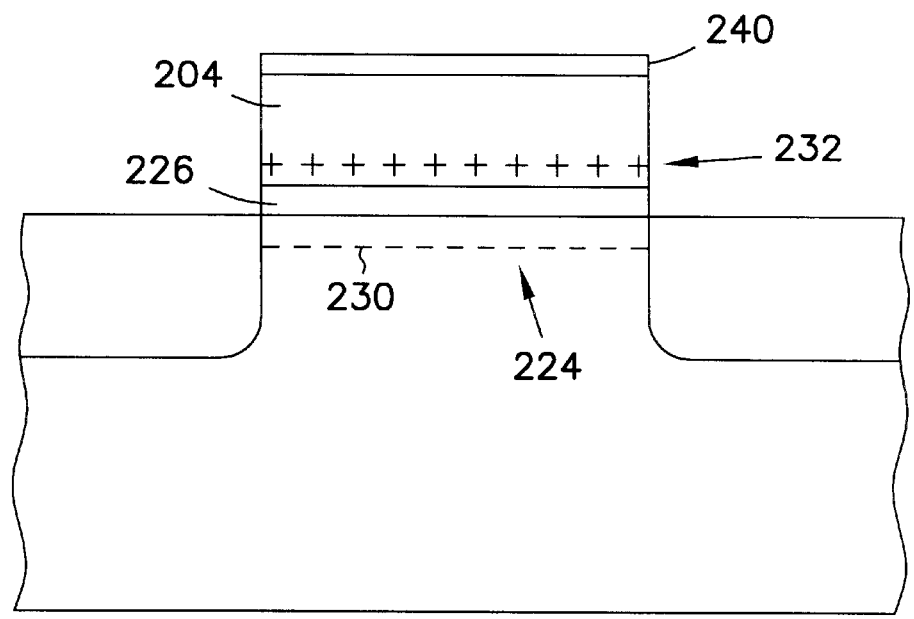
FIG. 3 is a cross-section of a magnified view of regions of the optical modulator of FIG. 2.

Referring to FIGS. 2 and 3, a TSOM 200 is illustrated which is fabricated as p-type complementary metal oxide semiconductor field effect transistor (PMOS FET) using a p-epi 202, n-well MOS process with silicided junctions and a polysilicon (poly) gate 204. During operation, the TSOM is illuminated, as described above, from the back side of the silicon integrated circuit substrate 206. Two optical paths are available for applied light. In the first optical path 210, light passes through the single crystal silicon and is reflected from a conductive layer located on top of the source/drain regions 214. The reflective layer can be formed as a metal contact, or can be a layer of silicide. When using a layer of silicide, an electrical contact can be located in an area which is not in the light path. The second optical path of light 212 thus passes through the single crystal silicon 206 and polysilicon gate 204 before being reflected from a layer of silicide located on top of the polysilicon gate. This reflected light then passes through same optical path. The reflected light is collected, for example using a photo diode (not shown). The reflected light is analyzed, as described above, to extract the electrical modulating signal. In contrast to the modulator of FIG. 1, the present modulator has the modulating signal applied to an n-well 220. This allows the modulator to operate using voltages which are within customary MOS power supply ranges. It is noted that a large gate electrode structure can be used as a primary reflective surface, and that the second reflective surface (above the source/drain areas) is not necessary.

The modulator of FIG. 1 is based on an NMOS inversion layer and may not produce substantial cumulative optical phase shifts. That is, the modulator includes depletion layers in the optical path (channel 106) which produce offsetting phase shifts in the opposite direction. In contrast, the n-well modulator embodiment 200 has excess free carrier (e.g., accumulation) layers in both the channel 224 and polysilicon gate 204 regions, see FIG. 3. This structure is compatible with fabrication methods in which the polysilicon gate is doped during a source-drain 214 implant operation. The gate is separated from the channel by a gate oxide layer 226.

In operation, an electrical signal is impressed on the light beam by taking the n-well potential high or low, to denote the two logical states 1 and 0. Thus, a substantial optical phase shift difference results in response to the n-well modulation. With the n-well at a low potential (e.g., ground), an accumulation layer 230 forms in the n-well (electrons). Because the gate polysilicon is p-doped during source/drain fabrication, an accumulation layer 232 is also formed in the polysilicon gate (holes), see FIG. 3. This causes four noteworthy free-carrier-induced optical phase shifts at the accumulation layers as the beam enters from the back side and is reflected from the silicide 240 on the polysilicon gate 204. Silicide 215, such as $TiSi_2$, can also be located on the source/drain regions 214 in place of metal contacts.

With the n-well at a high potential (opposite logical state), the accumulation layers go away. Further, p+ source-drain areas 214, p-epi 202 and substrate 206, and the built-in voltage of the gate actually deplete free carriers. This provides an optical phase shift in the opposite direction from the accumulation state. Such an arrangement maximizes the amount of free carrier-induced phase shift (and absorption) during one logical state, by introducing accumulation layers, and minimizes the same kind of phase shift during the other logical state, by introducing depletion layers in place of the accumulation layers.

The above PMOS accumulation FET are operated by toggling an n-well potential. Alternatively, the gate of the FET can be toggled with the well and source/drain potentials coupled to ground. For example, the n-well and p-junctions are coupled to ground, and a positive voltage, 0 to Vcc, is toggled to the gate. This embodiment creates accumulation layers in one data state and a neutral condition (not depletion) in the other data state. In another embodiment, both the gate and n-well potentials can be toggled to complementary states. As such, different operating states of the various embodiments of the present invention can be utilized to accomplish optical modulation. These operating states can be used for both NFET and PFET embodiments.

Figure 4:
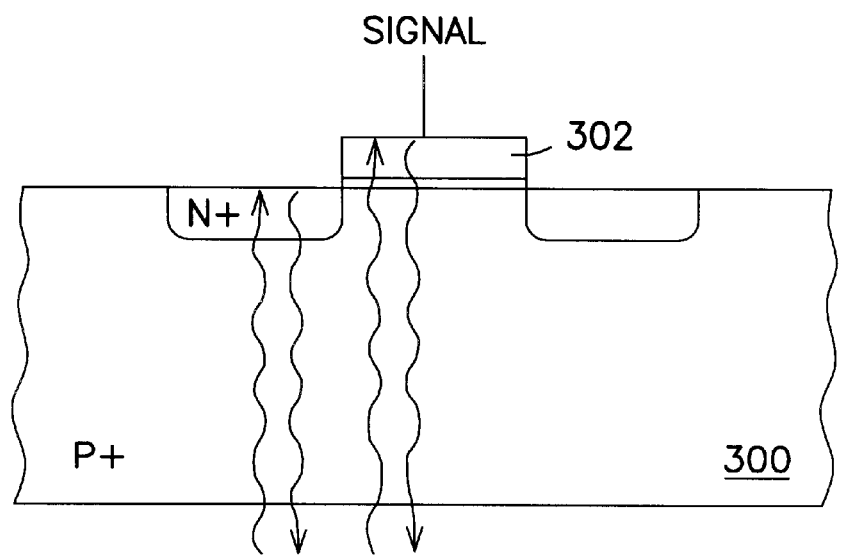
FIG. 4 is a cross-section of an NMOS optical modulator with accumulation layers.

Alternate embodiments of the above modulator can also be fabricated with NMOS FETs. That is, a NMOS FET (NFET) formed in a P-doped substrate 300 can be used in one embodiment, see FIG. 4. The gate polysilicon 302 must, however, be at a potential below the substrate potential to form the accumulation layers. As such, a negative voltage must then be applied to the polysilicon gate to achieve the same effect as the embodiment using the n-well. While this is not completely prohibitive, a charge pump circuit may be needed to implement the required gate voltages and may not be as convenient as the n-well modulator embodiment described above. Nonetheless, the well or gate modulation embodiments may provide benefits if the lateral resistance of the n-well results in a high frequency limit for the TSOM and photocarriers do not help enough in quick formation of the accumulation layer. Further, because the TSOM may be implemented as a repeated MOSFET array in a grating structure, an n-well tap may not be convenient to distribute in the array while preserving efficiency and periodicity.

Detecting the phase shift difference between the logical 1 and 0 electrical states has numerous solutions, known to those skilled in the art, and are not described herein. But it is useful to remember that these free carrier optical phase shifts can in principle be detected with an interferometer, external to the chip.

Figure 5:
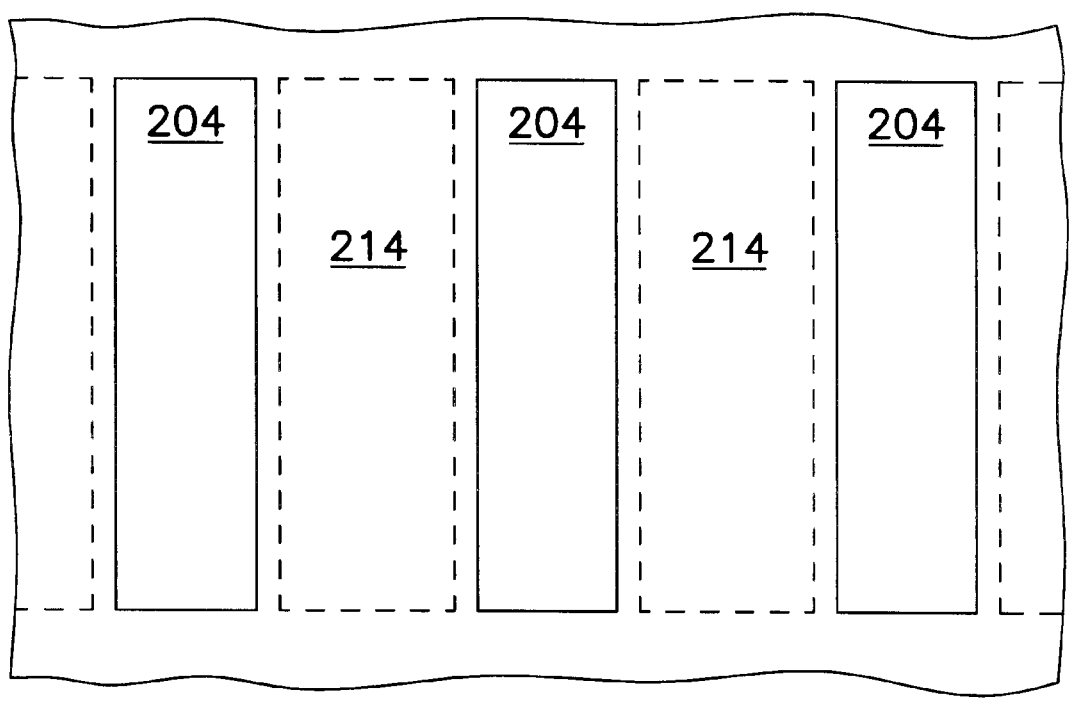
FIG. 5 illustrates a top view of one embodiment of a modulator array.

FIG. 5 illustrates a top view of one embodiment of an array formed using the accumulation modulators described above. The array is formed from a series of FET devices having long parallel gate electrodes 204. The cumulative area of the gates 204 and source/drain regions 214 are maintained to be approximately equal.

The reference (no phase shift) signal of the above described accumulation layer modulators can be improved in comparison with the phase shifted beam, as described below. The optical modulator described above can be fabricated in the form of a one-or two-dimensional grating, with a large number of individual MOSFET elements, to form a phase grating with sharp diffraction peaks. The terms "one-dimensional" and "two-dimensional" herein refer to the direction(s) of the gate electrodes. That is, a one dimensional grating has gate electrodes extending in one direction only, while a two dimensional grating has gate electrodes extending in two directions, as explained in greater detail below.

As stated above, the electrical signal from the chip is impressed on a coherent laser beam, incident from the back of the chip. While phase modulation in some FET regions (gates) takes place as described, other FET regions (e.g., contacted diffused junctions) are relatively undisturbed electrically. The portion of the optical beam reflecting from the undisturbed areas can serve as a reference beam if all MOSFET elements in the TSOM are identical, and have identical electrical signals applied to them.

Because a reflecting surface of a conductor which is in contact with the source/drain junctions is typically nonuniform and not optically flat, the reflected beam could contain a variety of random phases. Thus, the reflected light could be a poor (incoherent) reference beam. The phase modulation, therefore, may not be easily detected through interference effects, as desired.

In one embodiment of an optical modulator, standard metal contacts are eliminated from the source-drain regions. In addition, the FET modulator structure can be formed as a two-dimensional square or hexagonal array of regions with gates located in between the source/drain regions, as described below. The gate and source/drain areas are ratioed to be approximately equal, so that the phased and reference beam intensities match. The phase reference areas (source/drain regions) have smooth silicide reflecting surfaces, like the gate areas, resulting in a coherent phase reference. The source-drain regions do not need metal contacts under laser illumination because their potentials are pinned to the n-well by photovoltaic effects. In this embodiment, all reflecting surfaces are smooth such that there is no competition from incoherent reflections. Thus, the modulator acts as an interferometer, with the possibility of wavelength matching by controlling polysilicon gate thickness. For example, the light intensity would be proportional to cancellation of the two reflected beams, or $|1+\exp(i\theta+\phi(t))|^2$, resulting in very pronounced amplitude modulation if $\phi$ is near $\pi$, or $3\pi$, $5\pi$, etc. Where $\phi$ is proportionate to the gate thickness, and the electrically induced free-carrier phase modulation produces $\phi(t)$. A titanium silicide (TiSi$_2$) layer used in integrated circuit fabrications may reflect nearly all infrared laser light. This is because titanium silicide can have conductivity below 25 $\mu$ohm-cm and formed with a thickness over 50 nm, while the skin depth for infrared light is below 20 nm.

Using this reference technique, a nearly complete cancellation of the two reflected beams can be achieved, and the electrically induced free-carrier phase modulation can result in very pronounced amplitude modulation of the combined reflected beams at the detector.

One embodiment of a two-dimensional modulator array is described as follows. A two-dimensional phase modulator array 400 is illustrated in the FIGS. 6A and 6B. As stated above, the term "two-dimensional" refers the number of directions in which a gate electrode of the modulator extends. As illustrated, in one embodiment of the modulator the gate electrode is fabricated as a common grid structure 402 with source/drain regions 404 provided between the gate electrodes. The grid is formed with gate strips extending in both the X and Y directions.

Figure 6A:
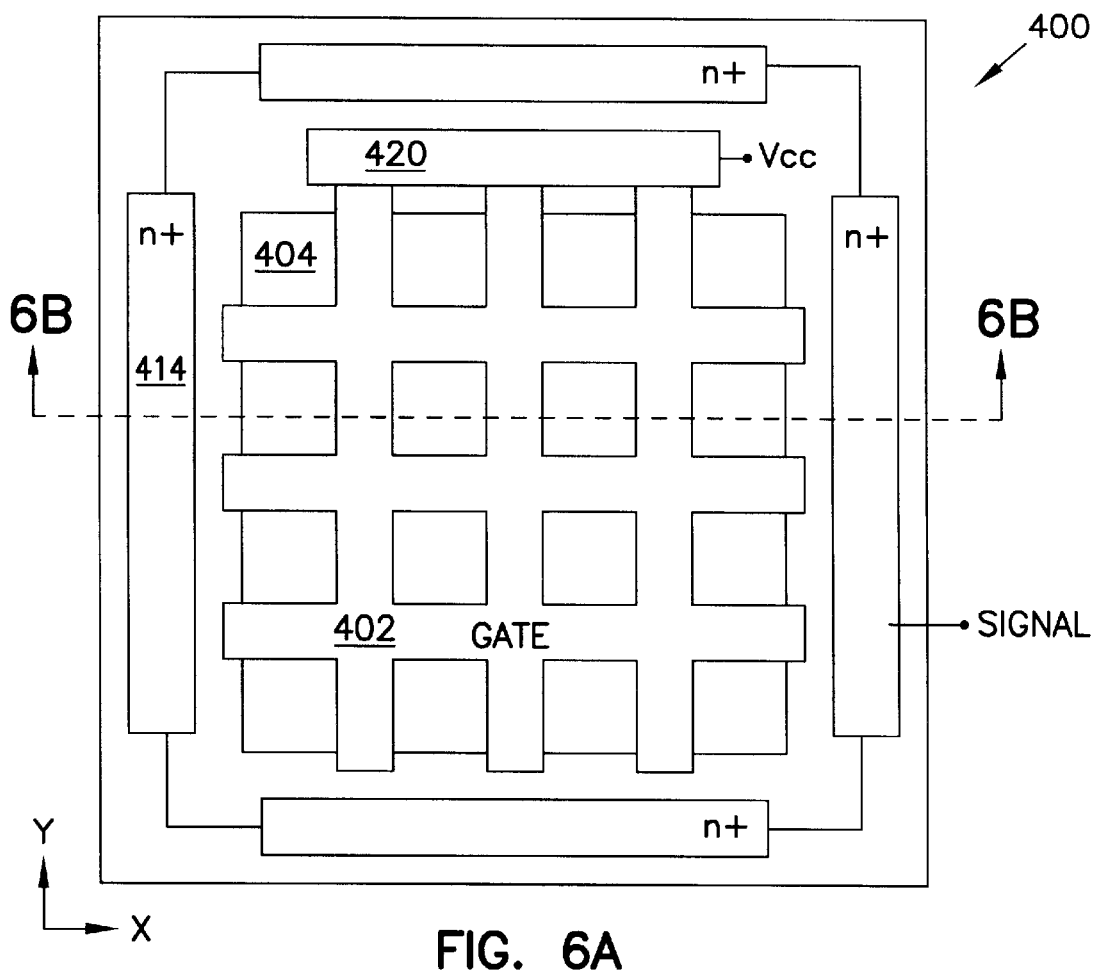
FIGS. 6A and 6B illustrate a top view and a cross-section of a two-dimensional phase modulator array.
Figure 6B:
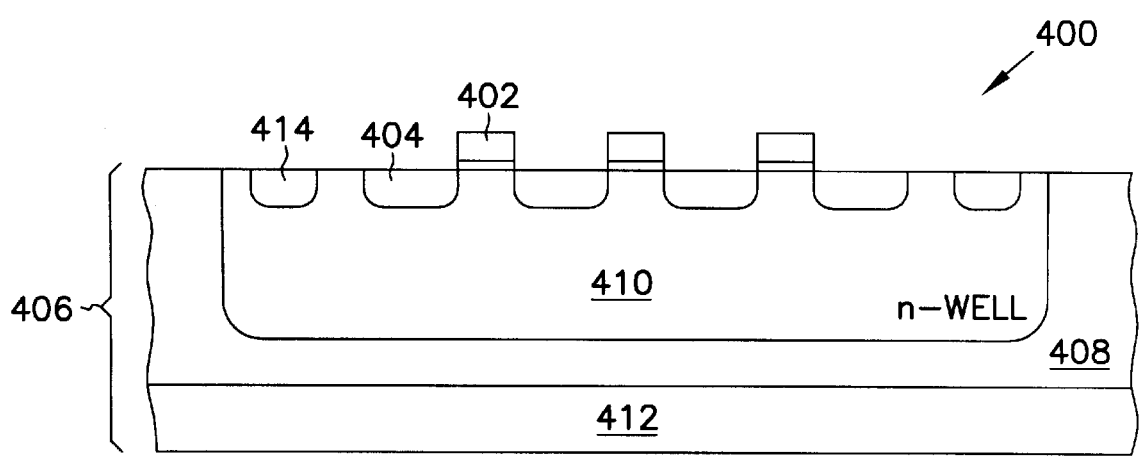

A cross section of the modulator is shown in FIG. 6B. The modulator is fabricated using a p-doped substrate 406 in which an n-doped isolation well 410 is provided. The p-doped substrate can include a p-doped epitaxial layer 408 provided on top of a p-doped substrate base layer 412. The integrated circuit substrate, therefore, is not limited to a base layer. The n-doped isolation well includes n+ regions 414 which provide a contact to the n-doped well. As explained above, a signal is coupled to the isolation well for inducing a phase shift in a reflected light beam.

The two-dimensional modulator array includes a plurality of source/drain regions 404. These source/drain regions are p+ doped. The location of the source/drain regions is dictated by the geometric configuration of the gate electrodes. As illustrated in FIG. 6A, one embodiment includes a gate electrode fabricated as a grid with the p-doped source/drain regions located in openings of the grid. The gate electrode surface area and the cumulative source/drain surface area are maintained to be approximately equal. The gate electrode grid is coupled to a voltage connection 420 for coupling the grid to a predetermined potential. In one embodiment, the gate electrode grid is coupled to an upper voltage supply (Vcc). Likewise, the n+ source/drain regions are electrically coupled together and configured to receive the signal.

Because the potentials of p-doped source/drain regions 404 are coupled to the isolation well potential by photovoltaic effects, the source/drain regions do not need metal contacts. That is, conventional field effect transistor (FET) source/drain regions have a metal layer fabricated on top of the source/drain regions to provide electrical contact to a source/drain potential. The metal layer contacts, however, do not provide a uniform flat reflected surface and could induce a variety of random phases in reflected light. The source/drain regions, in one embodiment, do not include metal layer contacts. But instead, are covered with a layer of smooth silicide to provide a reflecting surface. As a result, both the gate electrodes and the source/drain regions have a smooth silicide reflecting surface which eliminates competition from incoherent reflections.

In operation, the source/drain regions provide a reflected light reference, while a phase of the light reflected from the gate electrode depends upon a state of the signal coupled to the n-doped isolation well. The modulator, therefore, operates as an interferometer and allows for wavelength matching by varying the gate electrode thickness. Because the two primary reflected light beams are reflected from different planes (dependent upon gate thickness), they can be set up to cancel in the central maximum. That is, the two primary reflected light beams can provide nearly complete cancellation in an unmodulated state. This allows for very pronounced amplitude modulation when one state of the signal (Vcc) is coupled to the isolation well.

The geometric configuration of the gate electrode, as illustrated in FIG. 6A, is merely one embodiment of a two-dimensional optical modulator array. It will be appreciated by those skilled in the art, with the benefit of the present description, that other two-dimensional gate electrode and source/drain regions can be fabricated.

In a second embodiment, a gate signal producing the phase-shifting accumulation layers is applied to alternate gates in the array, leaving the other gates in either a neutral state at all times, or going from a neutral state to a depletion state when the other gates are causing accumulation. This creates a reference beam from alternate cells which is certain to be coherent with the phase-shifted beam, because the two beams come from metallurgically identical structures and reflect from the smooth silicided surfaces of the polysilicon gates. The phase shifted and reference beams are also matched geometrically. Because they are in the same plane, however, they cannot be set up to cancel in the central maximum.

Figure 7A:
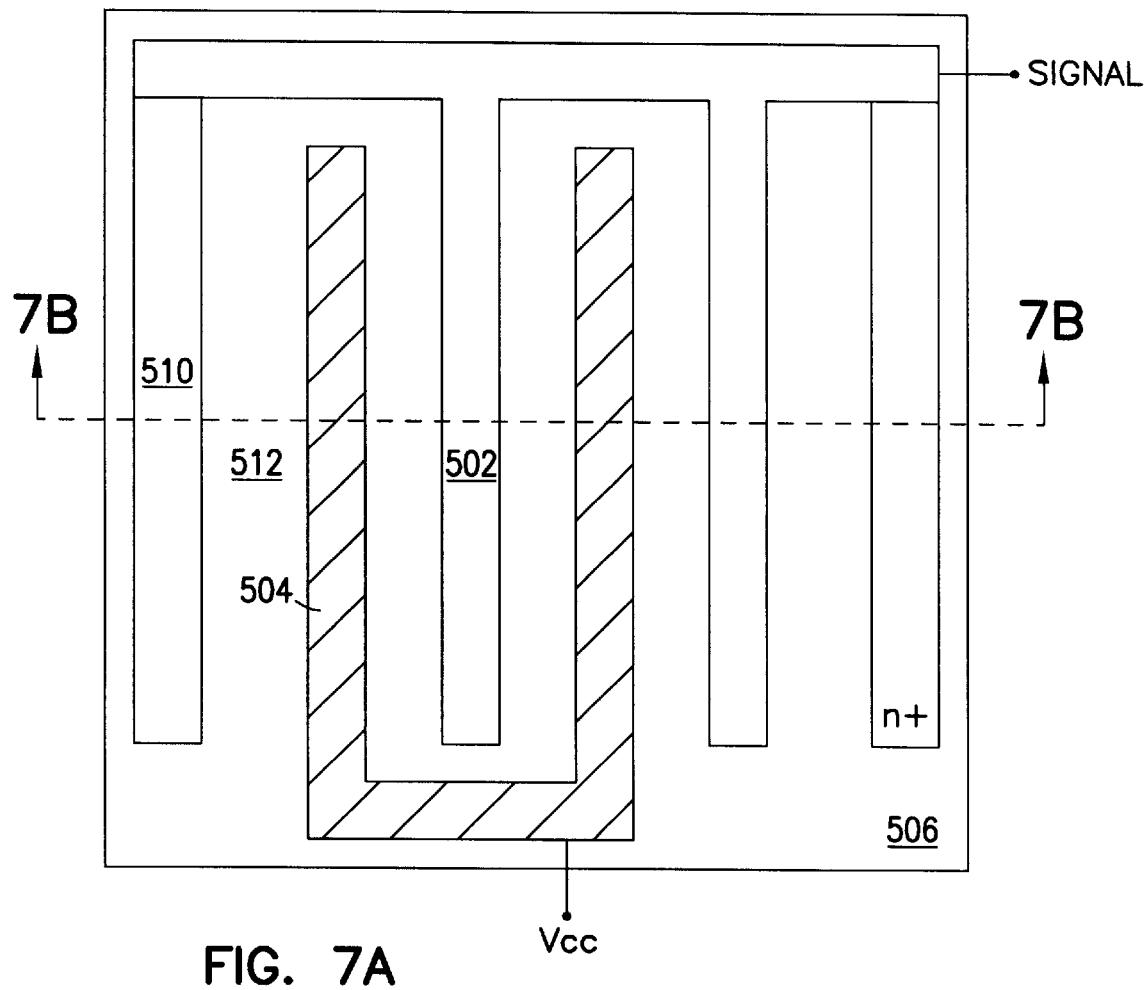
FIGS. 7A and 7B illustrate a top view and a cross-section of a one-dimensional phase modulator array.
Figure 7B:
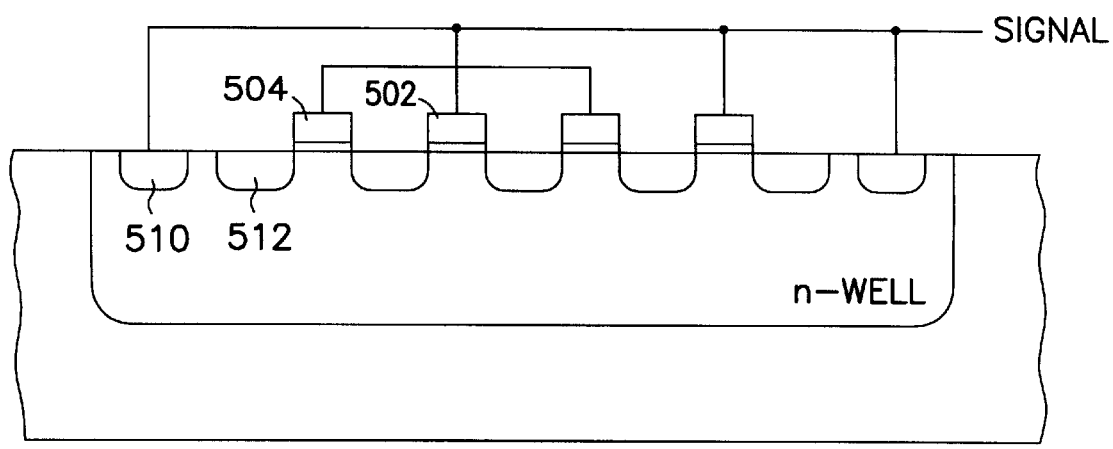

One embodiment of a one dimensional optical modulator array 500 is illustrated in FIGS. 7A and 7B. As stated above, the term one dimensional refers to the arrangement of the gate electrodes. As illustrated, this embodiment includes numerous gate electrode strips which are fabricated substantially parallel to each other. As such, the gate electrodes extend in only one direction (Y direction). In this embodiment, one-half of the gate electrodes 502 are used as reference reflectors while one-half of the gate electrodes 504 are used to selectively modulate a phase reflected light. The reference electrodes are electrically coupled to the potential of isolation well 506 (via n+ region 510) to prevent formation of accumulation layers. The remaining gate electrodes 504 are coupled to a common potential, such as upper voltage supply Vcc. In operation, light reflected from the reference gates do not experience phase shifts, while light reflected from the remaining gates experiences phase shifts due to formation of accumulation layers in both the isolation well and the gate electrodes, as described above. Again, the present invention can be operated using the gate electrodes 504 which are not coupled to the well 506 as the signal source, such that the signal is coupled to gate electrodes 504 with the well and electrodes 502 grounded.

Because the source/drain regions 510 are primarily needed to separate the gates, the area of the source/drain regions can be reduced. Further, the source/drain regions can be optionally coupled to ground potential using contact regions (not shown) located outside of an optically active area. It will be appreciated that this embodiment can be fabricated using an NMOS structure and appropriate signal potential levels to form accumulation areas in the desired gate electrodes, as described above. That is, the reference gate electrodes are coupled to the substrate while the modulated gate electrodes are coupled to receive a signal which has a potential less than the substrate potential.

With any of the above embodiments, one logical state (call it logic 0) will occur when all MOSFET signals produce as little free-carrier phase shift as possible. The other logical state (logic 1) will occur when the accumulation signal is applied to gates (one set of alternating gates for the second embodiment), producing an optical phase shift in one direction. Meanwhile, the reference section is either undisturbed, or has free carrier depletion, resulting in a beneficial optical phase shift in the opposite direction. The modulator embodiments alternate between a common mode in logic 0 and a differential mode in logic 1.

In the logic 1 state there is, with modulator 400 of FIG. 6A, a new periodicity in the grating is experienced which is twice that of logic 0. This means that the reflected beams will not cancel perfectly at the diffraction minima. Thus, there is a new diffraction line at the first minimum which is 100% modulated and reveals much about what phase shifts actually take place under the TSOM gates. This extra side lobe in the diffraction pattern may be most useful for diagnostic studies.

Figure 8:
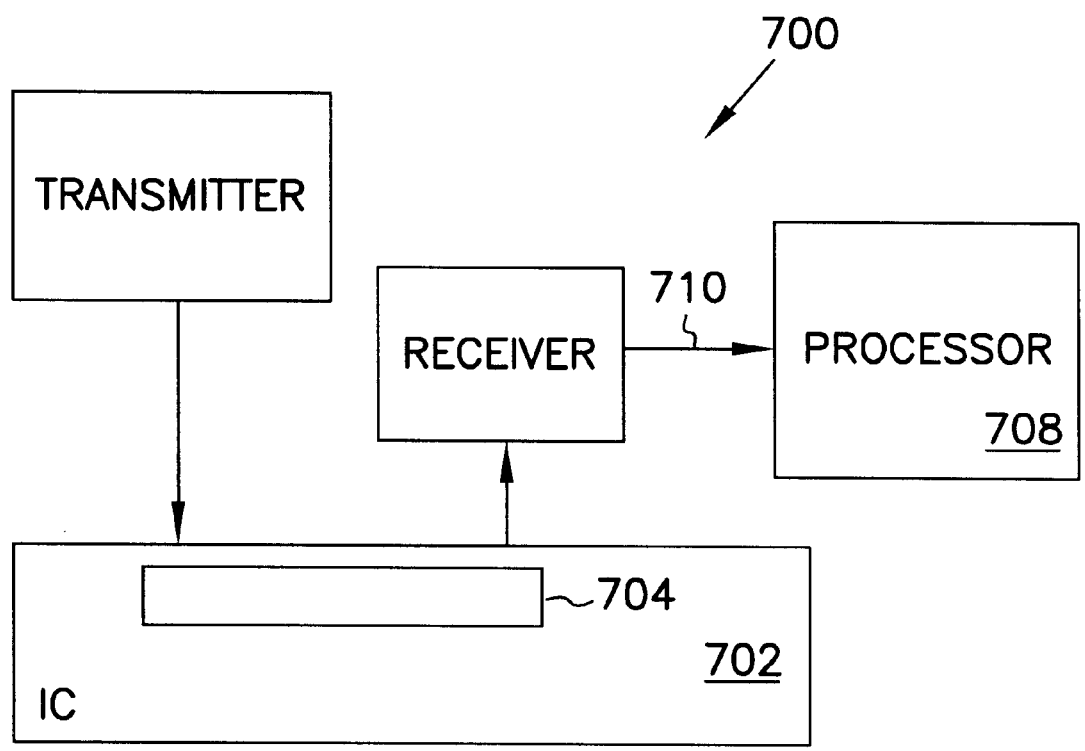
FIG. 8 is a communication system including an optical modulator.

FIG. 8 illustrates a communication system 700 using the optical modulators as described above. The system includes an integrated circuit 702 which has an optical modulator 704. The modulator communicates using a transmitter and a receiver. In one embodiment, the transmitter is located remotely from the modulator and coupled thereto by an optical communication line, such as fiber optics. A common transmitter, or light source, can provide incident light to numerous modulator devices using light beam splitters. One type of transmitter is a GaAs or similar solid-state laser light source. The receiver can also be physically located remotely from the modulator, and/or transmitter. An example of a receiver is a photodiode on an integrated circuit, accompanied by circuitry to interpret and process incoming light signals. It will be appreciated that the transmitter and receiver do not need to be located in a common device. In operation, the optical transmitter transmits a light beam, for example a laser light beam, which enters the integrated circuit and passes through the die. The light is either modulated in response to an applied signal, or is not modulated. The reflected light is received by the optical receiver, which determines a state of the signal based upon a phase shift of the reflected light, as explained above. The signal can then be transmitted to an additional device 708 via bus 710 which processes the signals. It will appreciated that the optical transmitter and/or receiver can be remotely located from the integrated circuit and optically coupled using known optic connections, such as fiber optic lines. Further, the optical transmitter and/or receiver can be integrated into the processing device. The integrated circuit and processing device can be, but are not limited to, processors, memories, communication switches, application specific integrated circuit devices (ASIC), chip sets. For example, the integrated circuit can be a microprocessor which is coupled to a memory device or other processor.

Through silicon optical modulators (TSOM) formed in a silicon integrated circuit have been described. The TSOMs comprise a grating array of MOSFET elements, in which optical phase shifts from different areas contrast with one another coherently. The phase modulated optical beams reflected from the grating interfere with one another and allow the modulation to be easily detected off-chip. In one embodiment, a two dimensional array is provided where the gate structure is used to modulate a light beam by forming accumulation layers. In another embodiment, a one dimensional array is formed using parallel gate strips, where alternate gates are used as reference reflectors. Although the embodiments described above are directed to MOS FETs, other integrated circuit fabrication technologies can be used, and the present invention is not limited to MOS structures.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An integrated circuit optical modulator comprising:
   an isolation well fabricated in a substrate of an integrated circuit;
   a plurality of source/drain regions fabricated in the isolation well; and
   a two-dimensional gate electrode array fabricated on top of the isolation well, such that the plurality of source/drain regions are located in openings in the two-dimensional gate electrode array, wherein the plurality of source/drain regions provide a reflected light reference and a phase of light reflected from the two-dimensional gate electrodes array is controlled in response to a voltage signal applied to either the isolation well or the two-dimensional gate electrode array such that light passing through the substrate is reflected by the gate electrode array and passes through at least two electrical accumulation layers when the voltage signal is in a first state.

2. The integrated circuit optical modulator of claim 1 wherein the two-dimensional gate electrode array comprises a plurality of perpendicular gate electrode strips fabricated to form a gate electrode grid.

3. The integrated circuit optical modulator of claim 1 wherein a surface area of the plurality of source/drain regions is substantially equal to a surface area of the two-dimensional gate electrode array.

4. The integrated circuit optical modulator of claim 1 further comprising a layer of silicide fabricated on top of the plurality of source/drain regions to provide a reflecting surface.

5. The integrated circuit optical modulator of claim 1 wherein the isolation well is n-doped, the plurality of source/drain regions are p-doped, and the two-dimensional gate electrode array is p-doped poly silicon.

6. An integrated circuit optical modulator comprising:
an n-doped isolation well fabricated in a p-doped substrate of an integrated circuit;
a plurality of p-doped source/drain regions fabricated in the n-doped isolation well;
a two-dimensional gate electrode array fabricated on top of the isolation well, and having a plurality of perpendicular gate electrode strips fabricated to form a gate electrode grid, wherein the plurality of p-doped source/drain regions are located in openings of the gate electrode grid; and
wherein the plurality of source/drain regions provide a reflected light reference and a phase of light reflected from the two-dimensional gate electrode array, is controlled in response to a voltage signal applied to either the n-doped isolation well or the two-dimensional gate electrode array such that light passing through the substrate is reflected by the gate electrode array, and passes through at least two electrical accumulation layers when the voltage signal is in a first state.

7. An integrated circuit optical modulator comprising:
an isolation well fabricated in a substrate of an integrated circuit;
a first plurality of gate electrode strips fabricated on top of the isolation well and extending in a first direction;
a second plurality of gate electrode strips fabricated on top of the isolation well and extending in the first direction such that the first and second plurality of gate electrode strips are fabricated substantially parallel;
a plurality of source/drain regions fabricated in the isolation well and located between the first and second plurality of gate electrode strips; and
wherein the first plurality of gate electrode strips are electrically coupled to the isolation well and provide a reflected light reference, the second plurality of gate electrode strips provide reflected light having a phase dependent upon a state of the signal.

8. The integrated circuit optical modulator of claim 7 wherein the first and second plurality of gate electrode strips comprise equal numbers of gate electrode strips.

9. The integrated circuit optical modulator of claim 7 wherein the isolation well is an n-doped isolation well fabricated in a p-doped substrate.

10. The integrated circuit optical modulator of claim 9 wherein the first and second plurality of gate electrode strips comprise p-doped poly silicon.

11. The integrated circuit optical modulator of claim 7 wherein the plurality of source/drain regions are coupled to receive a ground potential.

12. An integrated circuit optical modulator comprising:
an n-doped isolation well fabricated in a p-doped substrate of the integrated circuit;
a first plurality of p-doped gate electrode strips fabricated on top of the isolation well and extending in a first direction;
a second plurality of p-doped gate electrode strips fabricated on top of the isolation well and extending in the first direction such that the first and second plurality of gate electrode strips are fabricated substantially parallel;
a plurality of p-doped source/drain regions fabricated in the isolation well and located between the first and second plurality of gate electrode strips; and
wherein the first plurality of gate electrode strips are electrically coupled to the isolation well and provide a reflected light reference, the second plurality of gate electrode strips provide reflected light having a phase dependent upon a state of the signal.

13. The integrated circuit optical modulator of claim 12 wherein the first and second plurality of gate electrode strips comprise equal numbers of gate electrode strips.

14. A method of providing optically modulated signals from an integrated circuit, the method comprising:
transmitting light into a back side of the integrated circuit and through a substrate of the integrated circuit;
reflecting the transmitted light from a plurality of first reflecting areas to provide a reflected light reference; and
reflecting the transmitted light from a second reflecting area to provide second reflected light, wherein the second reflecting area is a gate electrode fabricated in a two-dimensional array, and wherein the plurality of first reflecting areas are located in openings of the two-dimensional array.

15. The method of claim 14 wherein the gate electrode is fabricated with a plurality of first and second polysilicon strips overlapping and extending in perpendicular directions to form a two-dimensional grid.

16. The method of claim 14 wherein a surface area of the plurality of first reflecting areas is approximately equal to a surface area of the second reflecting area.

17. The method of claim 14 wherein the plurality of first reflecting areas are source/drain regions formed in an isolation well located in the substrate of the integrated circuit.

18. The method of claim 17 wherein a top surface of the source/drain regions is covered with a silicide layer.

19. A method of providing optically modulated signals from an integrated circuit, the method comprising:
transmitting light into a back side of the integrated circuit and through a substrate of the integrated circuit;
reflecting the transmitted light from a plurality of first gates to provide a reflected light reference; and
reflecting the transmitted light from a plurality of second gates to provide second reflected light wherein a phase of the second reflected light varies in response to signals coupled to the plurality of first gates.

20. The method of claim 19 wherein integrated circuit comprises an isolation well fabricated in the substrate, and the plurality of first and second gates are fabricated above the isolation well.

21. The method of claim 20 wherein the first and second gates are fabricated as substantially parallel poly silicon strips.

22. The method of claim 20 wherein the isolation well is n-doped, the substrate is p-doped, and the first and second plurality of gates are p-doped.

23. An integrated circuit optical modulator comprising:
a first plurality of gate electrode strips fabricated on top of a substrate of the integrated circuit and extending in a first direction;
a second plurality of gate electrode strips fabricated on top of the substrate and extending in the first direction such that the first and second plurality of gate electrode strips are fabricated substantially parallel;
a plurality of source/drain regions fabricated in the substrate and located between the first and second plurality of gate electrode strips; and
wherein the first plurality of gate electrode strips are electrically coupled to the substrate and provide a reflected light reference, the second plurality of gate electrode strips are coupled to receive a signal having a potential greater than a potential of the substrate to provide reflected light having a phase dependent upon a state of the signal.

24. The integrated circuit optical modulator of claim 23 wherein the first and second plurality of gate electrode strips comprise equal numbers of gate electrode strips.

25. A optical communications system comprising:

an integrated circuit optical modulator located in an integrated circuit, the optical modulator provides signals using modulated light having phase shifts resulting from accumulation layers formed in the integrated circuit optical modulator, wherein a light beam enters through a substrate of the integrated circuit and is reflected such that a diffracted light beam is reflected from the optical modulator representing a state of the signals;

an optical transmitter for providing the light beam;

a receiver to receive the light beam reflected from the optical modulator, the optical receiver determines a state of the signals based on the reflected light; and a processor coupled to the optical receiver/transmitter for processing the signals provided via the optical receiver/transmitter.

26. The system of claim 25 wherein the integrated circuit optical modulator comprises:

an n-doped isolation well fabricated in a p-doped substrate of the integrated circuit;

a plurality of p-doped source/drain regions fabricated in the n-doped isolation well;

a two-dimensional gate electrode array fabricated on top of the isolation well, and having a plurality of perpendicular gate electrode strips fabricated to form a gate electrode grid, wherein the plurality of p-doped source/drain regions are located in openings of the gate electrode grid; and wherein the plurality of source/drain regions provide a reflected light reference and a phase of light reflected from the two-dimensional gate electrode is controlled in response to a voltage signal applied to the either the n-doped isolation well or the two-dimensional gate electrode such that light passing through the substrate is reflected by the gate electrode and passes through at least two electrical accumulation layers when the voltage signal is in a first state.

27. The system of claim 25 wherein the integrated circuit optical modulator comprises:

an n-doped isolation well fabricated in a p-doped substrate of the integrated circuit;

a first plurality of p-doped poly silicon gate electrode strips fabricated on top of the isolation well and extending in a first direction;

a second plurality of p-doped poly silicon gate electrode strips fabricated on top of the isolation well and extending in the first direction such that the first and second plurality of gate electrode strips are fabricated substantially parallel;

a plurality of p-doped source/drain regions fabricated in the isolation well and located between the first and second plurality of gate electrode strips; and wherein the first plurality of gate electrode strips are electrically coupled to the isolation well and provide a reflected light reference, the second plurality of gate electrode strips provide reflected light having a phase dependent upon a state of the signal.

* * * * *